United States Patent [19]

Lindsay et al.

[11] Patent Number: 4,750,210

[45] Date of Patent: Jun. 7, 1988

[54] METHOD AND APPARATUS FOR FINDING OBJECTS WITHIN A VISUAL DISPLAY

[75] Inventors: James W. Lindsay, Vancouver, Wash.; Gail W. Marshall, Beaverton, Oreg.

[73] Assignee: Tektronix, Inc., Beaverton, Oreg.

[21] Appl. No.: 943,279

[22] Filed: Dec. 16, 1986

[51] Int. Cl.$^4$ .............................................. G06K 9/38
[52] U.S. Cl. ...................................... 382/53; 382/50; 358/282
[58] Field of Search .............................. 382/9, 50, 53; 358/213.17, 213.19, 125, 126, 282

[56] References Cited

U.S. PATENT DOCUMENTS 4,547,676 10/1985 Suzuki et al. .................. 358/213.19
4,562,486 12/1985 Suzuki et al. ........................ 382/53

Primary Examiner—Leo H. Boudreau
Assistant Examiner—Donald J. Daley
Attorney, Agent, or Firm—William O. Geny

[57] ABSTRACT

A signal processing circuit for enabling a computer to quickly scan a memory having stored signals which represent a video image includes a flag generator responsive to a lit pixel detector for providing a flag signal to the memory to be stored in an address location indicating the presence of at least one lit pixel in that row. Incoming video, which includes data and sync signals, is digitized and examined by the lit pixel detector and a flag signal is clocked into memory at a predetermined address. The computer scans these address locations, which lie in a single column, to determine the identity of rows having a flag signal. This eliminates the need for the computer to scan the entire address space to locate an object of interest.

9 Claims, 1 Drawing Sheet

METHOD AND APPARATUS FOR FINDING OBJECTS WITHIN A VISUAL DISPLAY

BACKGROUND OF THE INVENTION

The following invention relates to a method and apparatus for scanning and locating within a stored image field those areas of the image field which contain an object of interest.

A video camera coupled with a video storage device (sometimes referred to as a "frame grabber") can photograph an image and store that image in a memory for analysis by a computer. The stored image may be in the form of an array of bytes which represent the brightness levels of respective pixels in a pixel matrix. For example, video cameras having a charge coupled device (CCD) provide an output in the form of successive frames of video data in which each frame contains a series of analog signals representing the relative brightness of pixels in the CCD. These may be converted to digital data and stored in memory.

A desirable feature in such systems would be the ability to scan the image field in memory and quickly locate areas of interest. Normally, to locate an object of interest in an image field, the computer must scan the entire memory, even areas where there is a complete absence of lit pixels. This is because the computer normally has no way of determining where in the image field an object of interest might be. Scanning the entire memory is time consuming and inefficient for the computer, especially where the object of interest may be a video trace which is contained within a relatively narrow band of rows.

SUMMARY OF THE INVENTION

The present invention provides a means of quickly finding objects of interest within a frame of digital video data stored in a memory.

A video camera photographs a visual image and provides a plurality of signals representing the respective brightness levels of pixels in a pixel matrix. A detector serially examines each pixel in each row of pixels in the matrix and determines the identity of those rows that contain at least one pixel whose brightness level is above a predetermined threshold. The rows thus identified are marked with a flag signal. A memory may then store the flag signals, thereby indicating the locations of an image of interest within the entire image field represented by the pixel matrix. This image may then be quickly located by scanning only those rows marked with the flag signal, and the computer may ignore rows which do not have a flag signal.

This technique permits rapid focusing or enlargement of an image on any display medium used to visually display the images stored in memory. Thus, a particular object or area of interest on the screen may be quickly located and a close-up visual display provided without the need for scanning the entire pixel matrix to locate only the area of interest.

Video provided by the camera in sequential data frames is routed through an analog-to-digital converter which converts an analog signal representing the relative brightness of each pixel to a byte of digital data. Each byte is examined to determine if the pixel is lit or unlit, and the presence of a lit pixel sets a flip-flop which, in turn, provides a flag signal which will be stored as a data byte in an address location in memory representing the first pixel in the row of video data past the actual location of the lit pixel. Thus, to find the object of interest, the computer need only to scan the first column of the pixel matrix to identify those rows possessing a flag signal, and to read those rows to provide an enlarged image to the viewer.

It is a principal object of this invention to provide a method and apparatus for quickly and efficiently locating an object of interest to be displayed on a visual display screen.

A further object of this invention is to provide a random access memory where frames of digital video data are stored together with a flag signal indicating the presence of portions of an object of interest in selected rows.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
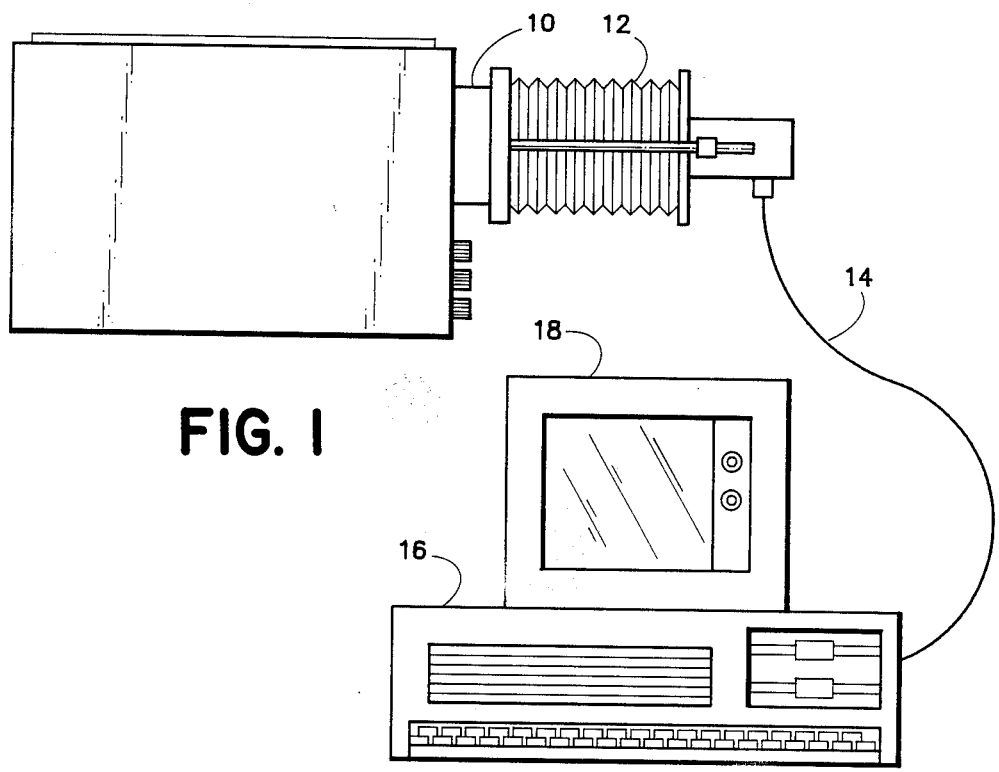
FIG. 1 is a schematic diagram of a system employing the present invention including a video camera and an associated microcomputer.

Referring to FIG. 1, an oscilloscope 10 may have a display screen (not shown) which is optically coupled to a digital camera 12. The digital camera 12 may include a charge coupled device (CCD) which is electronically scanned such that analog signals representing the relative brightness of the pixels of the CCD are serially provided as a video output together with horizontal and vertical sync pulses. These signals are converted to digital signals as will be explained hereinbelow, and provided over cable 14 to microcomputer 16 which may have its own display screen 18.

Figure 2:
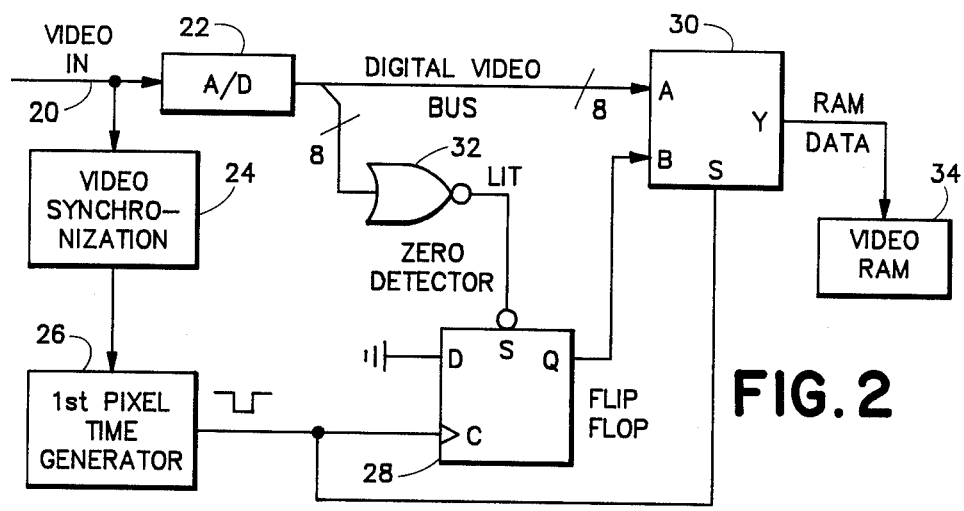
FIG. 2 is a block schematic diagram of a circuit contained within the digital camera for implementing the present invention.

Referring to FIG. 2, a video input line 20 is connected to an analog-to-digital converter 22 and a video synchronization circuit 24. The video synchronization circuit 24 provides an output consisting of the horizontal blanking pulses which occur between successive rows in a standard composite video signal. A first pixel time generator circuit 26 generates a pulse immediately following the horizontal blanking pulse, indicating the time when the first pixel of the new row is to be written into digital memory. This pulse is provided to the clock input C of flip-flop 28 and to the switching input of a multiplexer 30.

The output of A to D converter 22 is an 8-bit bus which forms the A input to multiplexer 30 and is also connected to zero detector 32. The zero detector 32 has an output connectecd to the "set" input S of flip-flop 28. Output Q of flip-flop 28 is connected to the B input of multiplexer 30. The Y output of multiplexer 30 is video data which is provided to a video random access memory (RAM) 34.

In actual operation, the digital video data is examined by zero detector 32 to determine the presence of any lit pixel. Zero detector 32 is a NOR gate which will go low whenever any line of the 8-bit input is high. This sets flip-flop 28 so that it will provide a digital signal on output Q which will represent a flag. This signal is provided to the B input of multiplexer 30 when the first pixel time generator 26 generates a pulse to clock the flip-flop. Simultaneously, the first pixel time generator 26 switches the multiplexer 30 so that the B input is provided to the video RAM 34. Since the first pixel time generator 26 provides a clocking pulse only when the pixel at the first column position is to be written into the video RAM 34, at all other times digital video on the digital video bus is written into video RAM 34. However, at the first column position of each row, flip-flop 28 is clocked and the multiplexer 30 is switched to the B input. If a lit pixel has been detected by zero detector 32, the B input will contain a flag signal which provides information to the RAM 34 which will be read by microcomputer 16 indicating that a portion of the object of interest is in the preceding row. Thus, the video RAM 34 contains video data in all address locations except the first column of each row which contains no video data, but contains a logical signal indicating the presence or absence of a flag.

In order to quickly locate an object of interest and thereby provide a focused close-up on the display screen 18, the computer 16 scans the first column of the address space of the video RAM 34 and locates the rows that are flagged. These rows can then be selectively displayed on the screen 18 to the exclusion of all other rows, thus providing an opportunity for a focused close-up of the object of interest. The computer 16 does not have to search the entire address space of RAM 34 in order to locate lit pixels, and this shortens the time needed to process a computer generated request for an enlargement of a selected portion of the display.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of finding objects recorded as signals representing the brightness of pixels in a pixel matrix, said pixel matrix including rows and columns of pixels, comprising the steps of:
   (a) sequentially examining each pixel in the pixel matrix to determine if at least one pixel in each row of said pixel matrix has a brightness level exceeding a predetermined threshold;
   (b) providing a flag signal to a predetermined address in a memory corresponding to a predetermined row position in a single column of an address space of said memory when a pixel is found having said brightness level exceeding said predetermined threshold; and
   (c) scanning said single column in said address space to find those rows which include said flag signals.

2. The method of claim 1, further including storing in said memory at all other address locations digital video data representing the relative brightness of all other pixels in said pixel matrix.

3. A video camera optically coupled to an electronic test instrument providing a visual display image, said video camera including a pixel matrix of light responsive elements comprising an array of rows and columns of pixels comprising:
   (a) detector means for serially examining the brightness of each pixel in each row of said pixel matrix and for generating a flag signal whenever at least one pixel in a row has a brightness that exceeds a predetermined threshold; and
   (b) memory means having address locations corresponding to the locations of respective pixels in said pixel matrix, for storing each of said flag signals at address locations therein which correspond to a single column, whereby the identity of those rows having a pixel above said predetermined threshold may be determined by scanning said single column in said memory means.

4. The signal processing network of claim 3, further including multiplexing means for combining said flag signal with said video data from said camera in said memory means.

5. The signal processing network of claim 4 wherein said multiplexing means is triggered by a video synchronization signal representing a transition from one row to a next row as said pixel matrix is scanned.

6. The signal processing network of claim 5 wherein said flag signal is stored in said memory means in said single column at the beginning of the row next following the row in which said pixel whose brightness level is above a threshold is located.

7. The video camera of claim 3 wherein said single column is the first column of said address locations in said memory.

8. In a video camera optically coupled to an electronic test instrument having a visual display, said video camera including a light responsive pixel matrix comprising rows and columns of pixels and having a video output comprising sequential analog signals representing the brightness of said pixels in said pixel matrix, and horizontal synchronization signals indicating the transition from one row to a next row during the scanning of said pixel matrix, the improvement comprising:
   (a) analog-to-digital converter means for converting said sequential analog signals to digital bytes of video data;
   (b) synchronization detector means responsive to said video output for detecting said horizontal synchronization signal;
   (c) threshold detection means for generating a flag signal when a pixel in a row is detected which has a light intensity above a predetermined threshold;
   (d) switching means for storing said video data in address locations in a memory corresponding to the locations of pixels in said pixel matrix, and including multiplexing means for transmitting all video data to said memory except the data representing a predetermined pixel position in each row, and for transmitting said flag signals to said memory to be stored in a location corresponding to said pixel position in each row upon receipt of a signal from said synchronization detector means indicating the start of a horizontal scan of a row in said pixel matrix.

9. The video camera of claim 8 wherein said pixel position is the first position in each row following the row in which the pixel is detected.

* * * * *